July 18, 1961  J. B. BORLAND ET AL  2,992,962
ADHESION OF NATURAL RUBBER TO BUTYL RUBBER
Filed Feb. 14, 1958

INVENTORS
JAMES B. BORLAND
HARVEY J. BATTS
BY Maurice B. Stiefel
ATTORNEY

2,992,962
ADHESION OF NATURAL RUBBER TO BUTYL RUBBER

James B. Borland and Harvey J. Batts, Indianapolis, Ind., assignors to United States Rubber Company, New York, N.Y., a corporation of New Jersey
Filed Feb. 14, 1958, Ser. No. 715,328
5 Claims. (Cl. 154—139)

This invention relates to an improved method of adhering brominated Butyl rubber to other rubbers such as natural rubber and to improved composite articles produced by such method.

The prior art teaches a number of ways to adhere natural rubber to Butyl. One of these is to utilize brominated Butyl rubber as the adhesive or connecting medium. However, when attempts are made to secure adequate adhesion between rubber and Butyl by means of brominated Butyl in accordance with the teachings of the prior art it is found that the adhesion is inevitably unsatisfactory. When an automobile tire is made by such prior art teachings using brominated Butyl to secure the adherence between the rubber and the Butyl, the tire will last for only about three or four hours on a test wheel. Such a wheel life should be increased by a factor of at least 15 to be considered to have practical applications commercially.

Accordingly, it is an object of our invention to provide an improved method of adhering rubber to Butyl utilizing brominated Butyl rubber.

Another object is to provide improved composite assemblies, such as pneumatic tire, comprising Butyl rubber, brominated Butyl and natural rubber.

It is yet another object of our invention to provide improved pneumatic tires and the like comprised of a Butyl rubber tread and/or sidewalls, adhered by means of a specially prepared brominated Butyl rubber composition to a carcass comprised of textile material and a highly unsaturated rubber, such as natural rubber, to which Butyl rubber is ordinarily poorly adherent.

Other objects and advantages of the invention will be made manifest in the following detailed description, which is intended to be read with reference to the accompanying drawing, wherein.

Figure 1:
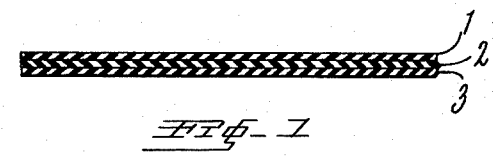
FIG. 1 is a cross-section of the three ply laminate of our invention.

Our invention is based on the unexpected discovery that the adherence between Butyl rubber and natural rubber utilizing brominated Butyl as the adhering medium can be vastly improved when the natural rubber ply has incorporated in it a mixture of a hydrated clay, zinc oxide, and depolymerized rubber.

As will be understood by those skilled in the art, depolymerized rubber is typically made by heating crude rubber, or vulcanized crude rubber, or scrap or reclaimed rubber, to an elevated temperature, generally within the range of from about 518° to 572° F. for a period of several hours. Such temperatures cause melting of the rubber and convert it to a form that remains flowable even after cooling to ordinary temperatures.

Brominated Butyl rubber is a conventional, commercially available material that may be prepared by a variety of methods, such as are disclosed, for example in U.S. Patents 2,631,984 issued to Crawford et al. on March 17, 1953; 2,700,997 issued to Morrissey et al. on February 1, 1955; and 2,720,479 issued to Crawford et al. on October 11, 1955. Frequently the brominated Butyl rubber contains from 0.5 to 10% by weight of combined bromine. It may be compounded for vulcanization in the same manner as ordinary Butyl rubber. It may also be vulcanized by divalent metal oxides such as zinc oxide.

Butyl rubber itself is a well known material, and may be defined as a rubbery copolymer of an isoolefin, usually one having from 4 to 8 carbon atoms per molecule, with a minor proportion of a polyolefin, usually one having from 4 to 18 carbon atoms. Such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3 and 1,4-dimethyl butadiene-1,3. The Butyl rubber contains only relatively small amounts of copolymerized diene, typically from about 0.5 to 5%, and seldom more than 10%, on the total weight of the elastomer. As is well known, Butyl rubber can be vulcanized or cured by heating it in admixture with such vulcanizing agents as sulfur-doning materials, such as the ultra-accelerators of sulfur vulcanization, e.g., tetramethyl thiuram disulfide ("Tuex") with or without elementary sulfur (zinc oxide activates such vulcanizing agents); dinitrosobenzenes (e.g., "Polyac"); quinone dioximes (e.g., "GMF"); and 2,6-dimethylol-4-substituted phenols or their resinous condensation products (e.g., "Amberol ST–137" resin), as disclosed in U.S. Patent 2,701,895 issued February 15, 1955 to Tawney and Little. [These may be accelerated by metal halides or other halogen-containing materials, as disclosed in U.S. Patent 2,726,224 issued December 6, 1955 to Peterson and Batts.]

The relatively low unsaturation of Butyl rubber distinguishes it from the other typical sulfur-vulcanizable olefin polymer rubbers, such as natural rubber and GR–S, which typically contain at least 25% unsaturation. Butyl rubber is difficult to adhere to the highly unsaturated rubbers. And, when brominated Butyl rubber is utilized as a tie-gum to secure adequate adhesion between Butyl and the unsaturated rubber, the adhesion is still not completely satisfactory. Further, when the brominated Butyl rubber is plied against the unsaturated rubber, which is a necessary step in a practical tire building operation, a severe degradation of the adhesion level occurs.

By means of our invention we are able to (1) vastly increase the level of adhesion between the unsaturated rubber and the brominated Butyl (and, of course, between the unsaturated rubber and the Butyl) and (2) eliminate the loss of adhesion ordinarily occasioned in plying brominated Butyl to unsaturated rubber.

In evaluating our invention and comparing it with the teachings of the prior art we developed a test, hereinafter referred to as a "Lay Up" test, which simulated the condition existing when brominated Butyl was calendered to rubber. In this test, the adhesion pad was made in the normal manner. That is, the pad was laminated as shown in FIG. 1 with the addition of square woven fabric, imbedded above and below for refinement. A separator was placed between the interfaces to be tested for a distance of one inch in order to provide starting tabs for the testing equipment. The material used as a separator may be cellophane, aluminum foil, or Mylar. However, instead of vulcanizing the pad immediately it was placed in a circulating air oven at 160° F. for three hours. The heat period of the Lay Up test may be considered as an accelerating aging test in cases where the stocks are plied up at room temperature, or it simulates the conditions existing when the stocks are plied up hot as at a calender.

The following examples, in which all parts are expressed by weight, will serve to illustrate the practice of our invention in more detail. All adhesion data listed were determined at 250° F. at a jaw separation rate of 2" per minute on the test machine and the pads were vulcanized 50 minutes at 307° F. in an air pressure cure mold under 125 p.s.i.g. pressure.

EXAMPLE 1

A prior art recommended receipe [1] was evaluated in adhesion to a conventional rubber tire carcass compound. The levels of adhesion are given below.

Rubber ply:
| | |
|---|---:|
| #1 Smoked Sheet | 100.00 |
| SRF Black | 40.00 |
| Zinc oxide | 5.00 |
| Stearic acid | 2.00 |
| Sulfur | 2.00 |
| BTS (benzothiazyl disulfide) | .70 |
| BLE (reaction product of diphenyl amine and acetone) | .75 |

Hycar 2202 Ply (brominated Butyl):
| | |
|---|---:|
| Hycar 2202 | 100.00 |
| EPC Black | 50.00 |
| Zinc oxide | 5.00 |
| Stearic acid | 3.00 |
| Sufur | 2.00 |
| BTS | .30 |
| Tuex (tetramethyl thiuram disulfide) | .60 |

[1] Service Bulletin—H-18, October 1954, Table 2, compound 3 (put out by B. F. Goodrich Chemical Company).

| Adhesion at 250° F. ||
|---|---|
| Regular Assembly | Lay Up at 160° F. |
| 7–8 lbs.—Specimen 1" wide. | 4.0 lbs. |

EXAMPLE 2

This example evaluates a brominated Butyl stock featuring a Bakelite resin (tackifier) BR-4036 and presents a further observation of adhesion levels. (BR-4036 is a 100% amyl phenol—formaldehyde unreactive thermoplastic resin).

Rubber ply:
| | |
|---|---:|
| #1 Smoked Sheet | 100.00 |
| SRF Black | 40.00 |
| Zinc oxide | 5.00 |
| Stearic acid | 2.00 |
| Sulfur | 2.00 |
| BTS | .70 |
| BLE | .75 |

Hycar 2202 ply (brominated Butyl):
| | |
|---|---:|
| Hycar 2202 | 100.00 |
| FEF Black | 50.00 |
| Zinc oxide | 5.00 |
| BR-4036 resin | 10.00 |
| Stearic acid | 1.00 |
| Santocure NS (N-tertiary butyl-2-benzothiazole sulfenamide) | 2.00 |
| Crystex sulfur | 2.00 |

| Adhesion at 250° F. ||
|---|---|
| Regular Assembly | Lay Up at 160° F. |
| 12–15 lbs. | 5.5 lbs. |

EXAMPLE 3

This example demonstrates the effect of sizeable portions of plasticizing oils in the Hycar 2202 (brominated Butyl) on adhesion to rubber.

*Adhesion of Hycar 2202 stock featuring 12.5 parts 160/180 Oil to Standard Rubber Carcass*

Rubber Ply:
| | |
|---|---:|
| #1 Smoked Sheet | 100.00 |
| SRF Black | 40.00 |
| Zinc oxide | 5.00 |
| Stearic acid | 2.00 |
| Sulfur | 2.00 |
| BTS | .70 |
| BLE | .75 |

Hycar 2202 ply (brominated Butyl):
| | |
|---|---:|
| Hycar 2202 | 100.00 |
| FEF Black | 50.00 |
| Zinc oxide | 5.00 |
| BR-4036 resin | 2.50 |
| Stearic acid | 1.00 |
| Hydrocarbon softening oil (160/180 oil) | 12.50 |
| DIBS (N,N-diisopropylbenzothiazole 2 sulfenamide) | .50 |
| Crystex sulfur | 2.00 |

| Adhesion at 250° F. ||
|---|---|
| Regular Assembly | Lay Up at 160° F. |
| 2.0 lbs. | 0 lbs. |

It will be noted from the preceding examples that the adhesion values were low and somewhat variable. Additional experimental work indicated that the plasticity of the rubber did affect the adhesion, but its influence was erratic and could not be exploited. Further, the use of zinc oxide in the rubber batch (master batch) did not appear to be significant. However, it was noted that the addition of Crown Clay or Suprex Clay helped the initial adhesion and dramatically increased the adhesion of the lay up test. Further, in conjunction with clay, the zinc oxide level appeared significant. In the following example the brominated Butyl compound used was the same as that given in Example 2. All variations were made in the master batch or rubber batch.

EXAMPLE 4

*Effect of milling*

| Master Batch | Additions to Master Batch |
|---|---|
| Rubber, 100.00 | A. Zinc Oxide, 5 pts. |
| SRF, 40.00 | B. Zinc Oxide, 15 pts. |
| Stearic Acid, 2.00 | C. Zinc Oxide, 25 pts. |
| BTS, .70 | D. Zinc Oxide, 15 pts.; Crown Clay 25 pts. |
| Sulfur (Crystex), 2.00 | E. Zinc Oxide, 25 pts.; Crown Clay 25 pts. |

| | Mooney Plasticity of Rubber in Base Stock Recipe |||||
|---|---|---|---|---|---|
| | Adhesion in Lbs. |||||
| | 70 | 60 | 50 | 40 | 25 |
| I. Pads assembled and cured: | | | | | |
| A | 3.5 | 4.0 | 4.0 | 3.5 | 6–7 |
| B | 40.0 | 40.0 | 6.0 | 10–15 | 5–7 |
| C | 4–5 | 9.7 | 5.0 | 4.0 | 4.5–6 |
| D | 10–15 | 9.5 | 11.0 | 15–25 | 10–20 |
| E | 13–24 | 22–25 | 11–16 | 8.5–11 | 6.5–8 |
| II. Pads assembled and layed up for 3 hours at 160° F.: | | | | | |
| A | | | | | |
| B | 5.0 | 5.0 | 6.0 | 7.0 | 5.0 |
| C | 3.5 | 4.0 | 3.5 | 4.5 | 3.5 |
| D | 10 | 15–20 | 8–15 | 15–22 | 25–35 |
| E | 33–36 | 23–25 | 7–10 | 5–7 | 5–11 |

EXAMPLE 5

*The effect of adding depolymerized rubber*

Example 4 illustrates that a high level of adhesion could be obtained, but the optimum condition had not yet been determined. We next added depolymerized rubber to the rubber carcass compound. To this basic compound were added variable amounts of zinc oxide and variable amounts of clay (Crown Clay). This work was done in rubber having (1) a polymer of Mooney plasticity of 60, and (2) a Mooney plasticity of 25.

The effect of varying depolymerized rubber, zinc oxide and Crown Clay is seen in the following tabulation. The depolymerized rubber was not varied because 10 parts was found to be satisfactory. Twenty parts was found to produce an unnecessary lowering of the physical properties such as modulus of the rubber vulcanizate.

*Effect of depolymerized rubber*

| Master Batch Recipe | Additions to Master Batch |
| --- | --- |
| Rubber, 100.00<br>SRF, 40.00<br>Stearic Acid, 2.00<br>BTS, .70<br>Depolymerized Rubber, 10.00<br>Sulfur (Crystex), 2.00 | A. Zinc Oxide,[1] 5 pts.<br>B. Zinc Oxide, 15 pts.<br>C. Zinc Oxide, 5 pts.; Crown Clay 25 pts.<br>D. Zinc Oxide, 15 pts.; Crown Clay 50 pts.<br>E. Zinc Oxide, 50 pts.; Crown Clay 25 pts.<br>F. Zinc Oxide, 15 pts.; Crown Clay 50 pts.; Sulfur (Crystex) 1.50 pts. |

[1] Total parts zinc oxide in each case.

|  | Mooney Plasticity of Rubber in Base Stock Recipe—Adhesion in Lbs. | |
| --- | --- | --- |
|  | 60 | 25 |
| I. Pads assembled and cured: | | |
| A | 5.5 | 5.0 |
| B | 5.0 | 5.0 |
| C | 25–28 | 16–35 |
| D | 8. | 17–17 |
| E | 9.5–24 | 7–30 |
| F | 9–11 | 12.5–24 |
| II. Pads assembled and layed up 3 hours at 160° F.: | | |
| A | 5.0 | 6.5 |
| B | 5.0 | 5.0 |
| C | 24–26 | 29–34 |
| D | 16.5 | 11.5 |
| E | 8–20 | 14–24 |
| F | 9–10 | 13–14 |

EXAMPLE 6

In this example numerous classes of mineral fillers were evaluated in place of Crown Clay, Suprex Clay, or any hydrated clay. It is obvious that no other material tested is operable.

*Effect of substituting other fillers for clay*

| Master Batch | Additions to Master Batch |
| --- | --- |
| #1 Smoked Sheet 60 Mooney, 100.00<br>SRF, 40.00<br>Zinc Oxide, 5.00<br>Stearic Acid, 2.00<br>BTS (Altax), .70<br>Depolymerized Rubber, 10.00<br>Sulfur (Crystex), 3.00 | A. Whiting, 25 pts.<br>B. Silene EF, 25 pts.<br>C. Hi Sil, 25 pts.<br>D. Barytes, 25 pts.<br>E. Lithopone, 25 pts.<br>F. Silene EF 25 pts. BTS .80 pts., Sulfur (Crystex) 1.5 pts.<br>G. Hi Sil 25 pts. BTS .80 pts., Sulfur (Crystex) 1.50 pts. |

I. Pads assembled and cured:     Adhesion in Lbs.

| | |
| --- | --- |
| A | 2.5. |
| B | 8.0 (undercure). |
| C | 12–13 (undercure). |
| D | 3.5. |
| E | 5.0. |
| F | 3.0.[1] |
| G | 4.0.[1] |

[1] F and G are B and C respectively with increased acceleration.

EXAMPLE 7

This example illustrates the optimum levels of ingredients indicated in Example 5. Adhesions of the level reported below were found to tear the rubber. Thus, there was no separation at the rubber-laminated Butyl innerface.

*Adhesion of a Hycar 2202 Stock featuring Bakelite resin Br–4036 to rubber featuring DPR*

Rubber Ply:

| | |
| --- | --- |
| #1 Smoked Sheet | 100.00 |
| SRF Black | 25.00 |
| Crown Clay | 25.00 |
| Zinc oxide | 25.00 |
| Stearic acid | 1.50 |
| BTS | .70 |
| Crystex (sulfur) | 3.50 |
| Depolymerized rubber | 10.00 |

Hycar 2202 Ply:

| | |
| --- | --- |
| Hycar 2202 | 100.00 |
| FEF Black | 50.00 |
| BR–4036 resin | 10.00 |
| Zinc oxide | 5.00 |
| Stearic acid | 1.00 |
| Santocure NS | 1.00 |
| Sulfur | 2.00 |

| Regular Assembly | 3 Hr. Ply Up at 160° F. |
| --- | --- |
| 35–40 lbs. | 35–36 lbs. |

It will be seen from the foregoing example that our invention constitutes a substantial contribution to the art. The examples illustrate that a vastly improved adhesion between rubber and Butyl and between rubber and brominated Butyl can be obtained when the rubber master batch has incorporated within it Crown Clay or Suprex Clay (or any hydrated clay), zinc oxide and depolymerized rubber. In a preferred form of the invention the proportions of Crown Clay, zinc oxide, and depolymerized rubber are 25, 25, and 10, respectively (based on 100 parts of natural rubber).

The three ply laminate embodying our invention is shown in FIG. 1, wherein a layer of Butyl rubber 1 adheres to a layer of brominated Butyl 2, which in turn adheres to a layer 3 of unsaturated rubber such as natural rubber. This latter layer 3 contains hydrated clay, zinc oxide, and depolymerized rubber, which results in vastly improved adhesion between layers 2 and 3.

Our invention also has application in a pneumatic tire and particularly wherein the carcass fabric is solutioned with vinyl pyridine to provide increased adherence between the brominated Butyl and vinyl pyridine. The use of a vinyl pyridine solution in this application is covered in application Serial No. 657,096 filed May 6, 1957 by Batts and Schrier, the contents of that application being expressly incorporated herein by reference.

Figure 2:
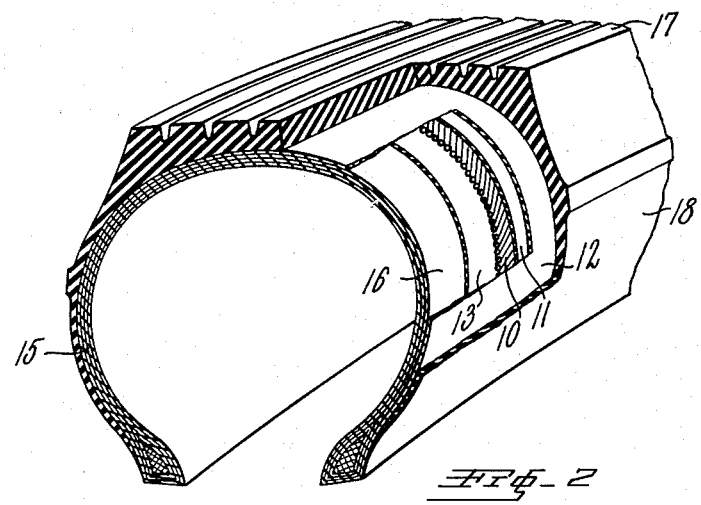
FIG. 2 is a fragmentary perspective view, with parts broken away, of a pneumatic tire constructed in accordance with the invention.

Referring to FIG. 2, rayon or nylon tire cord fabric 10 was rubberized with an unsaturated rubber such as natural rubber by passing it through a calender. The rubberized fabric was again passed through a calender, thereby depositing a layer 11 of natural rubber on its outer surface. (The natural rubber layer had incorporated within it depolymerized rubber, a hydrated clay, and zinc oxide, in the proportions of Example 7.) A layer 12 of brominated Butyl rubber stock was calendered onto the outer side of the layer of natural rubber 11, and a layer of tire carcass stock 13 made of natural rubber was calendered to the other side of the fabric 10. This assembly was used as the outer or fourth ply (the ply nearest the tread and sidewalls of the tire and that is last placed on by tire building division) of a 4-ply tire carcass 15, with the brominated Butyl rubber layer 12 facing outwardly. The inner facing 13 of carcass stock was in contact with the surface 16 of the third carcass ply, which was (like the remainder of the carcass) rubberized with the conventional carcass stock based on a highly unsaturated rubber. A Butyl rubber tread 17 and Butyl rubber sidewalls 18 were then applied to the carcass, such Butyl rubber being in contact with the brominated Butyl rubber layer 12 comprising the outer surface of the carcass. The assembly was vulcanized in a mold in the usual manner. It was found that the Butyl rubber tread and sidewalls were firmly adhered to the carcass of highly unsaturated rubber (through the medium of the brominated Butyl rubber layer acting in conjunction with the zinc oxide, hydrated clay, and depolymerized rubber contained in the unsaturated rubber layer 11).

Having thus described our invention, what we claim and desire to protect by Letters Patent is:

1. A method of adhering brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, to natural rubber comprising incorporating in said natural rubber a mixture of a hydrated clay, zinc oxide, and depolymerized rubber, applying the brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, to the natural rubber composition, and subjecting the resulting assembly to vulcanizing conditions.

2. A vulcanized laminate comprising a layer of brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, and a layer of natural rubber, said natural rubber layer having incorporated therein a mixture comprising depolymerized rubber, zinc oxide, and a hydrated clay.

3. A method of adhering natural rubber to a layer of solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, comprising applying between said layers a layer of brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, incorporating within said natural rubber a mixture comprising hydrated clay, zinc oxide, and depolymerized rubber, and subjecting the resulting laminated assembly to vulcanizing conditions.

4. A vulcanized laminate comprising a layer of natural rubber having incorporated therein a mixture comprising hydrated clay, zinc oxide, and depolymerized rubber, a second layer of brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, and a third layer of solid, plastic, rubbery, olefinically unsaturated interpolymer, a major proportion by weight of which is an isoolefin having from 4–8 carbon atoms per molecule, and a minor proportion of which is a polyolefin having from 4–18 carbon atoms per molecule.

5. A pneumatic tire comprising a plurality of rubberized fabric carcass plies, a tread and sidewalls of solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, the outer surface of the outermost ply comprising a laminate, one layer of said laminate comprising natural rubber, said layer adhered to the fabric of such ply, another layer of said laminate comprising brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, said natural rubber having incorporated therein a mixture comprising zinc oxide, depolymerized rubber, and hydrated clay, the said solid, plastic, rubbery, olefinically-unsaturated interpolymer, a major proportion by weight of which is an isoolefin having from 4–18 carbon atoms per molecule, and a minor proportion of which is a polyolefin having from 4–18 carbon atoms per molecule, tread and sidewalls being firmly adhered to the said rubberized carcass plies through the medium of the said brominated, solid, plastic, rubbery, olefinically-unsaturated interpolymer, a major proportion by weight of which is an isoolefin having from 4–8 carbon atoms per molecule, and a minor proportion of which is a polyolefin having from 4–18 carbon atoms per molecule, acting in conjunction with the said zinc oxide, depolymerized rubber, and hydrated clay contained in said natural rubber.

References Cited in the file of this patent

UNITED STATES PATENTS

| | | |
|---|---|---|
| 2,467,322 | Lightbown et al. | Apr. 12, 1949 |
| 2,486,782 | Hardman | Nov. 1, 1949 |
| 2,583,387 | Morrissey et al. | Jan. 22, 1952 |
| 2,720,479 | Crawford et al. | Oct. 11, 1955 |
| 2,760,894 | Wolf | Aug. 28, 1956 |
| 2,775,537 | Wilson et al. | Dec. 25, 1956 |
| 2,798,526 | Peterson et al. | July 9, 1957 |
| 2,821,232 | Wolf | Jan. 28, 1958 |